United States Patent [19]

Peterson

[11] Patent Number: 4,989,361
[45] Date of Patent: Feb. 5, 1991

[54] BAIT HOLDER FOR ATTACHMENT TO A FISHING LURE

[76] Inventor: Charles E. Peterson, 273 Shore Dr., St. Helens, Oreg. 97051

[21] Appl. No.: 488,266

[22] Filed: Mar. 5, 1990

[51] Int. Cl.$^5$ .............................................. A01K 83/06
[52] U.S. Cl. ..................................................... 43/44.2
[58] Field of Search ................ 43/44.2, 44.4, 44.6, 43/44.8

[56] References Cited

U.S. PATENT DOCUMENTS

| | | | |
|---|---|---|---|
| 564,517 | 7/1896 | Hastings | 43/44.8 |
| 1,461,246 | 7/1923 | Lent | 43/44.2 |
| 2,553,895 | 10/1947 | Carter | 43/44.2 |
| 2,755,593 | 7/1956 | Thurman | 43/44.2 |
| 2,900,754 | 8/1959 | Orlik | 43/44.2 |
| 3,624,950 | 12/1971 | Merckes | 43/44.2 |

Primary Examiner—Richard K. Seidel
Assistant Examiner—Chuck Y. Mah
Attorney, Agent, or Firm—James D. Givnan

[57] ABSTRACT

A length of wire or like material serves to insertably receive the bait selected. One end of the bait holder is shaped for snap on engagement with an elongate main member of a fishing lure while the remaining end of the holder is retained in place by removable engagement with a sleeve. The bait laden holders can be readily attached and removed from the lure.

4 Claims, 1 Drawing Sheet

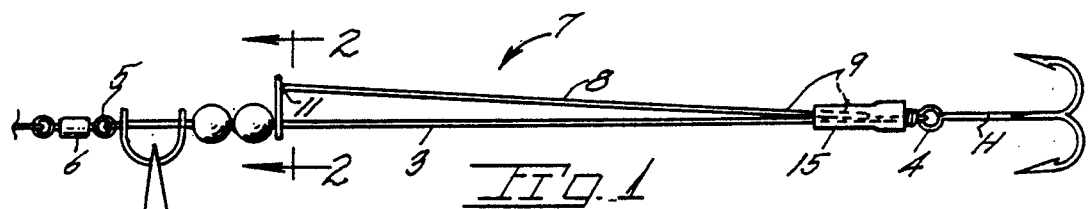
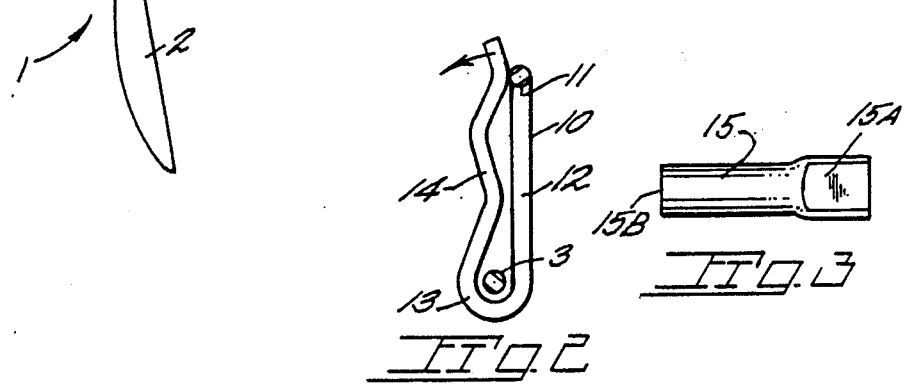
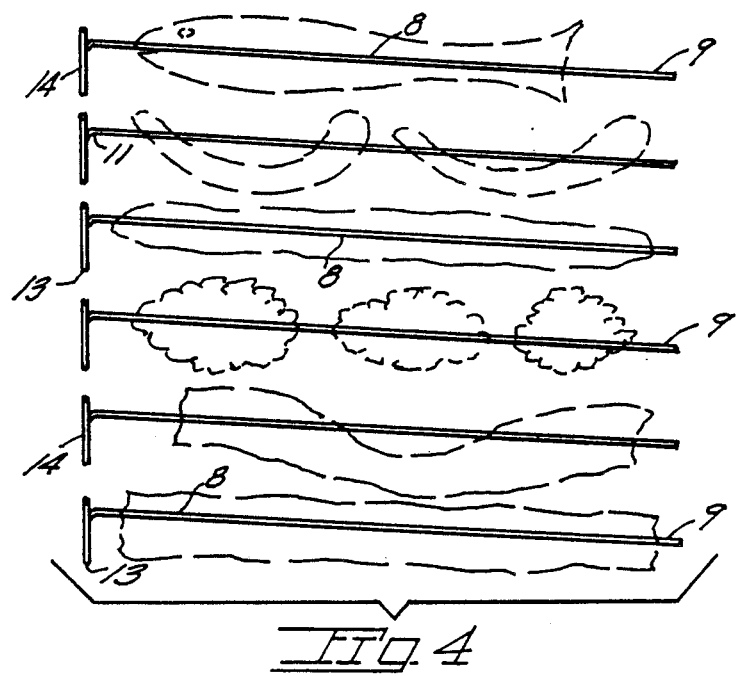

BAIT HOLDER FOR ATTACHMENT TO A FISHING LURE

BACKGROUND OF THE INVENTION

The present invention pertains generally to fishing lures.

In the fishing lure art are lures equipped with means serving to clamp a bait to the lure to enhance the lures attractiveness. A problem encountered with such lures is that considerable time is lost by the fisherman attaching bait or replacing a lost bait. Further, such attachment is by a clamping action between wire members which do not securely retain the bait against fish strikes or contact with obstructions.

SUMMARY OF THE PRESENT INVENTION

The present invention includes a length of wire which permits the bait to be skewered and then may be coupled to a fish lure all in a rapid manner.

It is highly desirable when fishing with bait to be able to replenish a lure with bait or change the type of bait in an effort to determine which bait is more effective. Toward this end the present invention permits the user to prepare beforehand and carry a supply of bait holders which may be readily attached to a lure to dispense with tedious and time consuming baiting of the lure at the fishing site. An elongate holder is adapted at one end for attachment, in a removal manner, to the lure while the remaining end of the bait holder device is received within retention means in place on the lure. The retention means when formed as a socket facilitates attachment of the bait holder. The present bait holder device serves to receive many different forms of bait with the bait being skewered to prevent loss. Accordingly, a collection of bait holder devices may be prepared beforehand to permit the user to fish successively with a wide array of baits until the most effective bait is found.

Important objectives include the provision of a bait holder device to which a variety of types of bait may be attached with the device thereafter engageable with the lure in a secure manner; the provision of a bait holder device which may be constructed from wire having one end for insertion into a retainer on the lure; the provision of a bait holder device formed from a length of wire having one end shaped so as to frictionally engage an elongate main member of the lure enabling both use of an artificial lure device and bait to attract fish.

BRIEF DESCRIPTION OF THE DRAWINGS

In the accompanying drawings:

FIG. 1 is a side elevational view of the present bait holder device in place unbaited on a lure;

FIG. 2 is a vertical sectional view taken along line 2—2 of FIG. 1;

FIG. 3 is an enlarged side elevational view of socket shaped retention means removed from the lure; and FIG. 4 is a series of bait holders in side elevation each equipped with various baits shown in dashed lines.

DETAILED DESCRIPTION OF THE PREFERRED EMBODIMENTS

With continuing attention to the drawings wherein the applied reference numerals indicate parts similarly hereinafter identified, the reference numeral 1 indicates generally a lure which may be of the type including an artificial lure device, as for example, a spinner 2.

An elongate main member 3 of the lure is a length of wire which may terminate at its end in attachment with the eye 4 of a hook H and forwardly with an eye 5 of a swivel 6. While a specific lure 1 is shown and described, it will be understood the present bait holder device is usable with various types of lures.

A bait holder is indicated generally at 7 in FIG. 1, with the bait removed, and includes a length of wire 8 having a bait insertable, straight end segment at 9. Straight end 9 permits wire 8 to serve as a skewer to assure positive retention of the bait.

The remaining end of the bait holder is shaped, per FIG. 2, with a spring clip 10 with a right angular bend at 11, a depending segment 12, a bend 13 and an irregular segment 14 which permits releasable attachment to member 3 in the manner of a resilient clip.

Retention means at 15 is preferably of sleeve configuration which is carried by lure main member 3. To prevent rearward displacement, the sleeve may be pinched somewhat as at 15A. The sleeve provides an opening at 15B in which may be inserted end 9 of the bait holder wire 8 during installation of the baited holder on the lure. During such installation, the bait holder is attached by a slight bowing of the holder enabling end 9 to clear the open end 15B of the retainer whereafter release of the holder permits same to straighten to effect seating of end segment 9 in the retainer. In some instances, and depending upon the size and nature of the bait, it may be practical to pinch the bait in place between elongate main member 3 of the lure and the present bait holder.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A bait holder for attachment to a fishing lure assembly having an elongate main member, said bait holder comprising in combination,
   an elongate retainer for lengthwise engagement with a bait and having an end segment,
   clip means formed at the remaining end of said retainer for retentive engagement with the elongate main member of the lure assembly, and
   a sleeve for placement on said elongate main member of the fishing lure assembly for engagement and having an open end for inserted reception of the end segment of said elongate retainer.

2. The bait holder claimed in claim 1 wherein said elongate retainer is a length of flexible wire, said clip means formed from said wire, said end segment being of straight configuration.

3. The bait holder claimed in claim 1 wherein said elongate retainer is flexible and of a length to assure endwise engagement with said sleeve when the elongate retainer is in its relaxed state.

4. The bait holder claimed in claim 1 wherein said clip means and said sleeve cooperate with components of the lure assembly to confine the elongate retainer against lengthwise displacement relative the lure assembly.

* * * * *